Jan. 1, 1929. A. A. THOMAS Re. 17,186

LOUD SPEAKING TELEPHONE RECEIVER

Original Filed Dec. 14, 1923 2 Sheets-Sheet 1

INVENTOR

Adolph A. Thomas

Jan. 1, 1929.

A. A. THOMAS

LOUD SPEAKING TELEPHONE RECEIVER

Re. 17,186

2 Sheets-Sheet 2

Original Filed Dec. 14, 1923

INVENTOR

Adolph A. Thomas

Reissued Jan. 1, 1929. Re. 17,186

UNITED STATES PATENT OFFICE.

ADOLPH A. THOMAS, OF NEW YORK, N. Y., ASSIGNOR TO THE CROSLEY RADIO CORPORATION, OF CINCINNATI, OHIO, A CORPORATION OF OHIO.

LOUD-SPEAKING TELEPHONE RECEIVER.

Original No. 1,614,327, dated January 11, 1927, Serial No. 680,597, filed December 14, 1923. Application for reissue filed March 28, 1927. Serial No. 179,169.

My invention relates to telephone instruments, and its main object is to provide a loudspeaking receiver particularly adapted for use in radio reception, although not limited to this field.

One of the main sources of trouble encountered in the operation of radio loudspeakers heretofore on the market, is due to the armature or diaphragm of the magnet striking the pole pieces when the airgap is adjusted too close. To obtain a strong reproduction through these prior devices, it is necessary to adjust the armature or diaphragm as closely as possible to the magnetic pole pieces but when that is done, the armature or diaphragm is liable to strike the pole pieces when a strong current passes through the speaking coil. The result is a distorted reproduction. On the other hand, when the airgap between the magnet and its armature (or diaphragm) is increased so as to avoid the danger of the armature striking the pole pieces, the effect of the current in the coil is weakened, and the resultant reproduction is correspondingly feeble.

One of the main purposes of my invention is to overcome the foregoing defects and difficulties in prior loudspeakers, and to this end I have provided a loudspeaking telephone receiver in which the magnetic effect of the coil on the armature may be varied independently of the airgap between the armature and the pole pieces. This regulation of the magnetic effect of the speaking coil, as I may call it, is accomplished by varying the reluctance of the magnetic path of the flux set up by the current in the coil. One of the simplest ways of varying this magnetic reluctance is to provide an adjustable iron core for the coil. In the practical embodiment, which I prefer at the present time, the core of the coil is made in two sections, one of which is adjustable with respect to the other, so that the sections may either be brought closely together to form a continuous core, or may be separated by an airgap. By simply adjusting this airgap, the magnetic effect of the coil on the armature is varied accordingly, without varying or disturbing the airgap between the armature and the pole pieces.

In accordance with a further feature of my invention, I provide a magnet in which one or both of the pole pieces are bifurcated and the bifurcations of each pole piece are connected by a magnetic core on which a telephone coil is mounted. This construction readily lends itself to the adaptation of the adjustable core feature previously referred to.

Another feature of my invention consists in means for varying the effective leverage between the armature and the acoustic diaphragm. As this leverage is increased or diminished, the vibrations of the armature are transferred in the diaphragm with a correspondingly increased or diminished effect.

My invention further comprises improved means for mounting the operative parts in a readily accessible position within an outer casing, which is adapted to carry a horn and be supported on a stand, or which may be used for connection with a fixed horn, like a phonograph horn enclosed in a cabinet.

The foregoing and other objects and advantages of my invention will become clear from a detailed description of the accompanying drawings, which show my invention in two illustrative embodiments. In these drawings—

Figure 5:
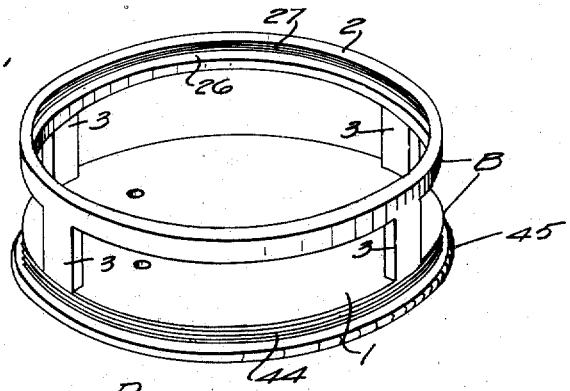
Fig. 5 is a detached perspective view of the casting which directly supports the operative parts in the construction shown in Figs. 1 and 2.

The parts which comprise the electromagnetic mechanism of my new telephone receiver are directly mounted on a casting or support indicated as a whole by B, as best shown in Fig. 5. This support, which may conveniently be cast or molded out of suitable non-magnetic material, such as aluminum or bakelite, consists of a circular base 1, a ring 2, and connecting posts 3. If desired, these parts may be made separate and rigidly secured together, but it is preferable to mold or cast them in a single rigid piece. So it will be understood that when I refer to the part B as a casting, I use the term merely for convenience.

Figure 2:
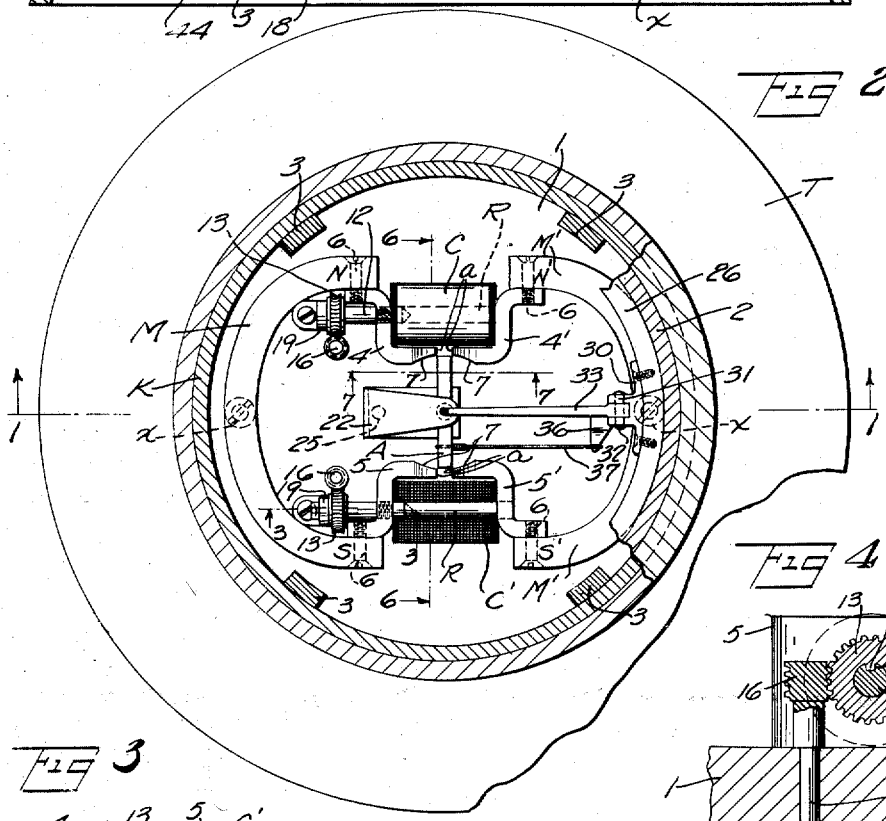
Fig. 2 is a top plan view in section, approximately on the broken line 2—2 of Fig. 1.

On base 1 are mounted two permanent steel magnets M and M′, which are oppositely arranged and suitably spaced from each other at their polar ends. The magnets are firmly held on base 1 in any practical way, as by screws *x* passing through the base into the magnets. As shown in Fig. 2, the magnets are so arranged that their like poles lie opposite each other. To the poles N and S of magnet M are secured pole pieces 4 and 5, and to the poles N′ and S′ of magnet M′ are secured pole pieces 4′ and 5′. These pole pieces are preferably of soft iron, or other material of high magnetic permeability. Any suitable means may be used for holding the pole pieces in firm contact with the magnets. In the drawings I have shown the pole pieces attached directly to the polar ends of the magnets by screws 6. As seen in Fig. 2, the pole pieces extend toward each other at their tips and are separated by an airgap *a* of a width depending upon the width of the ends of the armature, to be presently referred to. The tips of the pole pieces are cut away to form curved concave ends 7. The curvature of these ends is preferably in a circle struck up from the axis of rotation of the armature, for a purpose that will presently become clear. It is evident that the magnets M and M′ constitute in effect a single magnet having a bifurcated north pole 4—4′ and a bifurcated south pole 5—5′. Although I have referred to the magnets M and M′ as permanent magnets, they may obviously be in the form of electromagnets.

Between the pole pieces 4 and 4′ is mounted a coil C, and between the opposite pole pieces 5 and 5′ is arranged a similar coil C′. The coils C and C′ are connected in series and in effect constitute a single coil. It will be understood, of course, that the coils C and C′ are properly connected in a suitable telephone circuit in which the current varies in accordance with sound waves intended to be reproduced by the receiver. For convenience I will, therefore, refer to the coils C—C′ as the telephone coil.

The posts 3 of casting B are preferably so spaced that the magnets with their pole pieces and coils may be inserted and removed as a unit through the space between oppositely arranged pairs of posts, as will be apparent from Fig. 2. This facilitates the assembling and inspection of the mechanism.

Figure 3:
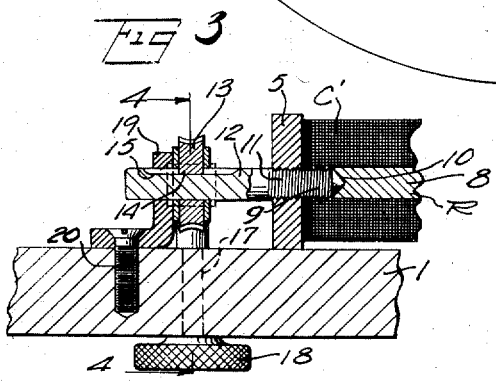
Fig. 3 is an enlarged fragmentary view in cross-section, approximately on line 3—3 of Fig. 2, showing means for adjusting the airgap in the core of the coil.

Each coil C and C′ is provided with an iron core R, which connects the associated pair of pole pieces 4—4′ and 5—5′. In the particular embodiment illustrated in the drawings, each core R consists of a fixed section 8 and an adjustable section 9. This is best shown in Fig. 3. The fixed section 8 terminates in a conical recess 10, into which fits closely the tapered end of movable section 9. When these correspondingly shaped ends of the two core sections are brought together, they form a continuous iron core. When the section 9 is moved away from the section 8, an airgap is formed, which decreases the magnetic effect of the coil to an extent depending upon the width of the airgap, other factors being considered equal. This will be understood by those skilled in the art, without further explanation.

The airgap formed in or at the end of core R, when once adjusted, may be said to be fixed or permanent in that it is not affected by the vibratory movements of the armature. In other words, while the airgap between the pole pieces and the vibratory armature is variable, the controlling airgap provided for the core of each coil is stationary and wholly independent of the armature airgap. As far as I know, this feature is broadly new, and it may be employed in various combinations in electric instruments of the telephone type other than the specific embodiment shown in the drawings by way of example.

Figure 4:
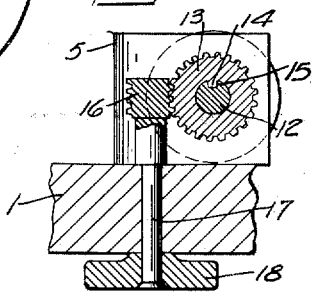
Fig. 4 is a cross-section on line 4—4 of Fig. 3.

In the broad aspect of my invention, any practical arrangement may be provided for adjusting section 9 of one or both cores R. In the drawings I have shown a simple way of effecting the desired regulation of the airgap in the core by a screw-threaded rotation of adjustable section 9. For this purpose section 9 is provided with fine screw-threads 11, adapted to engage similar screw-threads in the pole piece through which the section passes. Section 9 is provided with an extension in the form of a stub-shaft or arbor 12, preferably of non-magnetic bearing material. On the arbor 12 is mounted a small fine-toothed gear wheel 13, which is so connected with the shaft that it rotates the same and yet allows axial movement of the shaft 12 with respect to the gear-wheel. This connection may be formed by providing the gear wheel 13 with a lug or key 14, arranged to engage in an axial slot or groove 15 in shaft 12. In this way, the gear wheel 13 is always locked to the shaft so as to rotate the same when the gear wheel is rotated, and at the same time the gear wheel allows axial movement of the shaft due to the screw-threaded mounting of the core section 9 in the associated pole piece. The gear wheel 13 is rotated in one direction or the other by a worm 16 formed on or secured to a pin 17, which extends through the base 1 of casting B. The outer end of pin 17 carries a suitable finger piece, such as a knob 18, for rotating the worm 16. If desired, the outer end of arbor 12 may be supported in a suitable bearing 19, which may simply be an angle piece attached to the base 1 by a screw 20. It is apparent, as may be seen from Fig. 4, that the core section or bar 9 is automatically locked in adjusted position against turning and can be operated only through the manually controlled worm 16.

When it is desired to adjust the core section 9 relatively to the fixed section 8, it is only necessary to turn the finger piece 18 one way or the other until the required adjustment has been secured, as the operator will determine from the acoustic effect of the coil. When the core sections 8 and 9 are in contact with each other, the magnetic effect of the coil is a maximum and the acoustic effect of the instrument is correspondingly loud. When the core section 9 is separated from the section 8 by an airgap, the ultimate acoustic effect of the coil is decreased in a degree depending upon the width of the airgap. To inform the operator which way to turn the finger piece 18, suitable notations may be provided on the finger piece and the base 1 to indicate the "loud" and "soft" movements of the finger piece. The operative connections between finger piece 18 and the movable core section 9 are such as to secure a very delicate adjustment of the core section, so that the airgap in the core may be adjusted to a very small fraction of an inch. The adjoining ends of the core sections 8 and 9 may be cut off straight, but I prefer to shape them conical, so as to secure a better and finer adjustment owing to the increased area of the cone-shaped airgap.

Figure 1:
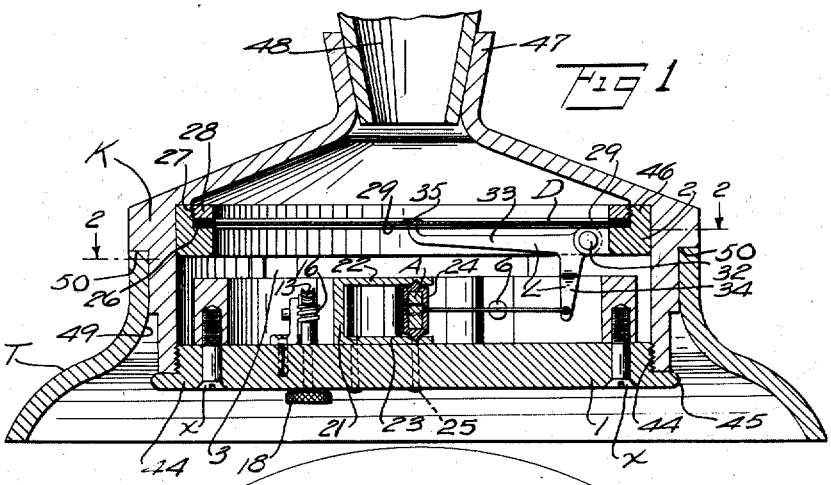
Fig. 1 is a transverse cross-section on line 1—1 of Fig. 2, showing a loudspeaking telephone receiver constructed in accordance with my invention.
Figure 6:
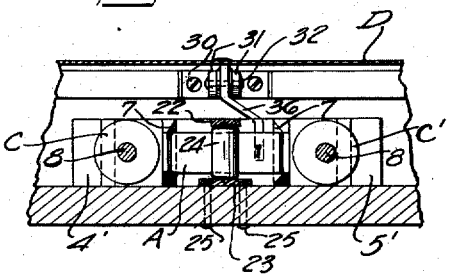
Fig. 6 is a fragmentary view in cross-section on line 6—6 of Fig. 2.

Between the tips or free ends of pole pieces 4—4′ and 5—5′ is mounted an armature A, which may simply be a short flat bar of iron of the right size and dimensions, depending upon the relative arrangement and size of the pole pieces. The armature is operatively supported between the pole pieces in any practical way. In the drawings I have shown a U-shaped bracket 21 having a pair of projecting arms 22 and 23 between which is pivoted a stud 24 constructed to hold the armature A. In Fig. 1, the stud 24 is shown slotted to receive the armature and support the same rigidly at the center. The bracket 21 is firmly mounted on the base 1 of casting B, as by means of screws or bolts 25 passing through the lower arm 23 into the base 1 (see Fig. 6). Any other practical mounting for the armature may be used.

Figure 7:
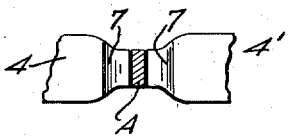
Fig. 7 is a fragmentary view in cross-section on line 7—7 of Fig. 2.

The armature A is of such size and dimensions that in its normal position the ends thereof practically span the airgap *a* between each pair of pole pieces, as shown in Fig. 2. If the pole pieces are wider than the armature, the polar tips 7 may be reduced to the same width as the armature, as indicated in Fig. 7. This tends to reduce magnetic leakage. Furthermore, the ends of the armature are so shaped as to move in close proximity past the curved tips 7 of the pole pieces 4—4′ and 5—5′ without actually touching the same. In this way the airgap between the pole tips 7 and the armature is always maintained at a minimum, without the possibility of the armature ever striking the pole pieces, no matter how wide its arc of vibration under the influence of coil C—C′. Also, it should be noted that the adjustment of either core section has no effect on the normal magnetic flux, so that an airgap produced in the core does not increase the reluctance of the path traversed by the flux of magnet M—M′. As will be clear from Fig. 2, the construction of field magnet and armature is such that there is practically no magnetic leakage. This arrangement produces an instrument of high sensitivity and efficiency. The clearance between the correspondingly curved polar tips 7 and the ends of the armature may be made as small as mechanical conditions permit. This minimum airgap, which yet makes it impossible for the armature to rattle against the pole pieces, causes a weak current in coil C—C′ to produce a maximum response of the armature. When both coils C and C′ are used, they are so wound that their effect on the armature is cumulative. That is to say, they act on the armature ends like a turning couple.

Attention is drawn to the fact that the adjustable core R, or whatever equivalent arrangement may be employed to vary the reluctance of the path of the coil flux, permits utilization at all times of practically the full magnetic field strength in its action on the armature. There is no shunting or diverting of any part of the normal field flux from the operative airgap between the pole pieces and the armature. This constant maintenance of the normal magnetic field at full strength in its relation to the armature causes minute current variations in the speaking coil or coils to produce a maximum effect on the armature, thereby imparting to the instrument a high degree of sensitivity. The practical value of a normally strong field in this connection is evident from the fact that the tractive force of a magnet is proportional to the square of the flux density. Hence, slight variations in the flux density acting on the armature, as produced by small current fluctuations in the speaking coil, react strongly on the armature. When I say that the armature is always subject to the full strength of the normal magnetic field, and that the magnetic regulating device for the flux of the coil does not divert or shunt any portion of the normal magnetic field from the armature, I do not mean that the normal field flux passes through the length of the armature, as shown in the illustration of Fig. 2. I simply mean that practically the full strength of the magnetic field is always exerted on the vibratory armature across the operative airgap or airgaps, irrespective of any particular arrangement of magnet and armature. Of course, it will be understood that due allowance is made for such magnetic leakage or losses as cannot possibly be avoided in the mechanical construction of the invention, no matter how carefully carried out.

On the ring 2 of casting B is mounted an acoustic diaphragm D of proper design and material. There are many kinds and styles of diaphragms on the market suitable for this purpose. The most common material of which these diaphragms are made is mica, which is moisture-proof and gives a strong reproduction. Some people prefer a diaphragm of wood, especially maple, which gives a more pleasing reproduction than mica though perhaps not so strong.

Diaphragm D is held in place on the ring 2 in any practical way. In the embodiment shown in the drawings, the supporting ring 2 has an inwardly projecting shoulder or flange 26 and a screw-threaded wall 27. The diaphragm is clamped firmly in position by a screw-threaded ring 28. It is preferable to clamp the diaphragm between a pair of washers 29 of felt, leather, rubber, or other sound-absorbing material.

To the ring 2 is fixed a bracket 30 having a pair of spaced lugs 31, between which is pivoted at 32 a lever indicated as a whole by L. This lever is in the form of a bell-crank comprising a long arm 33 and a short arm 34. The free end of the long arm 33 is rigidly secured to the center of diaphragm D, as indicated at 35 in Fig. 1. The short arm 34 of lever L is provided with a lateral extension 36, which may be an integral part of the lever. The free end of the extension 36 is connected to the armature A by a rod or stiff wire 37, or any other practical means. The point at which the rod 37 is connected to the armature depends upon the amplifying ratio which it is desired to secure between the vibratory movements of the armature and the vibratory movements of the diaphragm D. By properly calculating the distance between the center of the armature and the point of connection of the rod or wire 37, and by further calculating the lengths of the arms 33 and 34 of lever L, any desired leverage between the armature and the diaphragm can be secured. These calculations are well within the skill of the man conversant with this art.

Figure 8:
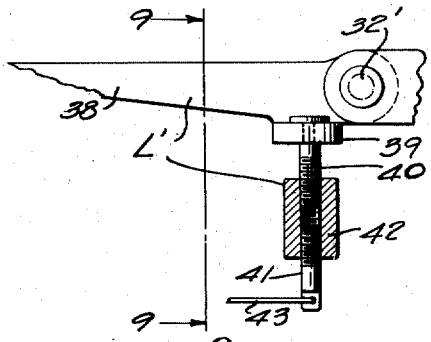
Fig. 8 is an enlarged fragmentary view of an adjustable connection between the armature and the diaphragm for varying the effective leverage between the two.
Figure 9:
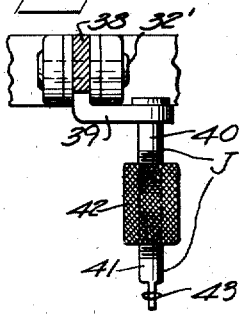
Fig. 9 is a view on section line 9—9 of Fig. 8.

In Figs. 8 and 9, I have shown a modified form of connection between the armature and the diaphragm. In this construction, the connecting lever, indicated as a whole by L′, comprises a long arm 38, a lateral extension 39 and an adjustable short arm indicated as a whole by J. This arm comprises a pair of short rods or pins 40 and 41, which are adjustably connected together through an oppositely screw-threaded nut 42. The ends of the pins 40 and 41 are in screw-threaded engagement with this nut, and by turning the nut one way or the other, the pins are drawn closer together or forced apart. In this way the effective leverage between the pivot point 32′ and the lower end of the arm J can be adjusted as required. The arm J is at its lower end connected to the armature through a suitable link 43, which may be a stiff wire or any other practical connection. The adjustable lever L′ is applicable in the construction shown in Figs. 1 and 2, and to avoid repetition of drawings, it will be understood that the lever L′ may be substituted for the lever L.

Although I have shown a specific form of adjustable arm J, it is clear that in the broad aspect of my invention there are various ways of carrying out this idea, and Figs. 8 and 9 are, therefore, to be considered as merely illustrative.

The support or casting B, which carries the operative parts of my new loudspeaking telephone receiver, is preferably constructed to be inserted as a unit into an outer casing. In Fig. 1, there is an outer casing or housing indicated as a whole by K. This casing may be cast or molded as a single piece of any suitable material, such as bakelite, aluminum and the like. Casing or housing K is of proper size and design to receive the casting B and all parts carried thereby. The lower inner end of casing K is screw-threaded to receive the screw-threaded section 44 of casting B, which thus forms a cap or housing for the lower end of the casing. To permit easy manipulation of casting B in screwing it into or out of the casing K, the base 1 of the casting may be formed with a slightly projecting flange or rib 45, which is easily grasped by the fingers. When the casting B is properly screwed into the outer casing K, the top of ring 2 and annular clamping ring 28 rests against a shoulder 46 formed inside of the casing, as shown in Fig. 1.

The top of outer casing K is provided with a central opening which is surrounded by a flange or extension 47 adapted to receive the inner end of a horn 48. For this purpose the extension 47 may be made slightly cone-shaped, so as to provide a tight fit for the horn. When the outer casing K is used to support a horn 48, the casing is mounted on a suitable base or stand T, which is provided with an opening 49 of proper size to receive casing K. As seen in Fig. 1, the casing has an annular shoulder 50 which rests on top of the stand T. Casing K fits snugly and firmly into the stand T without the necessity of any fastening devices. The frictional securing means thus formed by the snugly engaging surfaces of base T and casing K is sufficient to hold the casing rigidly on its supporting base. To remove the casing K and all parts carried thereby, it is only necessary to separate it from the stand T, which is easily done without the use of tools. The instrument may be used without the stand T, as when it is desired to connect it to a phonograph horn embodied in a cabinet. In that case the extension 47 on the cover of casing K is so shaped as to fit over the small end of a mounted horn.

Figure 10:
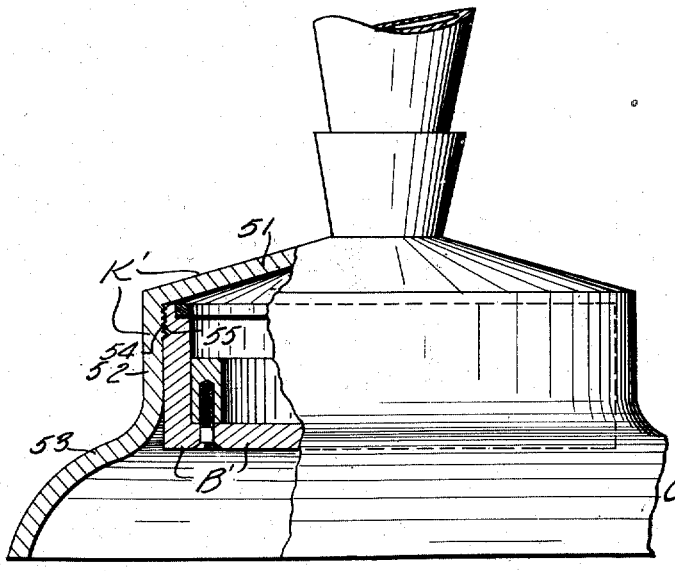
Fig. 10 shows a modified form of supporting casing for the parts, a portion of the outer wall and the inner casing being broken away for clearness.

In Fig. 10 I have shown a slightly modified form of outer casing and support for the operative parts. The outer casing K′ is preferably cast or molded in a single piece and also constitutes the stand or base for the instrument. In other words, the outer casing K′ consists of a cover 51, a cylindrical wall 52, and a stand 53. The cylindrical portion 52 of the cover has screw-threads 54 arranged to engage corresponding screw-threads 55 of a support indicated as a whole by B′. The support B′ is generally similar to the support B previously described in detail, and is adapted to carry the operative parts in the same way as described in connection with support B.

Although I have shown and described the magnet M—N′ as provided with two coils C and C′, in the broader aspect of my invention it is sufficient if only one coil is used. In that case, the other pole piece would be solid and not bifurcated, Personally, I prefer to use a coil for each end of the armature, so as to secure the greatest effect with a weak current.

The operation of my new receiver will be clear to anyone skilled in the art and I need not, therefore, go into any details on this point. I need only say that normally the armature A is held in a neutral or balanced position between the tips of the pole pieces, as shown in Fig. 2. When a variable current passes through the coil or coils C—C′, the normal magnetic balance of the armature is disturbed by the resultant magnetic effect of the coils and the armature vibrates in a manner well understood. These vibrations are in accordance with the current variations in the coil and are transmitted in increased ratio through the connections previously described. In this way, the smallest vibrations of the armature are repeated by the diaphragm in magnified movements, so that the sound produced by the diaphragm may be heard at a distance.

While I have herein shown and described a specific form of magnetic structure and armature arrangement, I want to make it clear that I have done so merely by way of example and that the feature of adjusting the magnetic effect of the coil on the armature can be used with any other practical construction of magnet and the vibratory member operated thereby.

In the broader aspect of my invention, the particular means for varying the effect of the telephone coil independently of the airgap between the armature and the pole pieces, may be carried out in other practical ways than the one herein shown and described for the sake of illustration. For instance, this feature of my invention can be used in a construction where the armature is in the form of a diaphragm of magnetic material adapted to vibrate under the influence of the coil. In such a case the diaphragm D is not necessary. Therefore, in the claims, when I mention an armature without reference to a diaphragm, I mean broadly any movable magnetic member arranged to be influenced by the magnet. When I speak of varying or adjusting the magnetic effect of the coil, I do not, of course, mean the variations produced by the variable current in the coil, since those variations are automatic and beyond the control of the user of the instrument.

In radio reception broadcast programs vary all the way from the reporting of sporting events to the rendition of music by bands and orchestras. The same loudspeaker will usually not reproduce all of these different numbers satisfactorily without adjustment or regulation of the magnetic effect of the coil in the loud-speaker. When a person desires a loud number on a program reproduced softly, he adjusts the loudspeaker to decrease the magnetic effect of the coil on the armature. In the particular instance illustrated in the drawings, this is done by turning the finger piece 18 in a direction to produce an airgap between the core sections 8 and 9. On the other hand, when, for instance, a violin solo is broadcast, the instrument would probably be adjusted to give out a maximum volume of sound. This would be effected by closing the airgap between the core sections 8 and 9, in the particular construction shown in the drawings.

Either core or both cores R may be adjustable. For simplicity, I have shown each core adjustable independently of the other. However, it is obvious that the gear wheels 13 can be simultaneously operated in either direction by a single connection carrying both worms 16, so that only one finger piece 18 would be necessary. As this arrangement is clear to any mechanic, I need not show or describe it in detail.

There is another practical advantage inherent in the arrangement of the telephone coil in a magnetic path between pole pieces of greater permeability than the permanent magnet. As previously explained, the permanent magnet M—M′ is made of steel, while the pole pieces are made of a material of high permeability. Expressing this differently, the retentivity of the pole pieces and core is lower than that of the steel body of the magnet. It is well known that the steel or steel alloy used for permanent magnets is hard steel, so as to retain the magnetization. The high retentivity of hard steel causes it to be less susceptible to variations in the magnetizing or demagnetizing force. Hence, in those prior telephone receivers where flux variations due to variable impulses in the talking coil must pass through the body of the permanent body, the efficiency of the instrument is lowered, because the steel mass of the magnet offers considerable resistance to flux variations, and this resistance increases with increased frequency of the variable magnetizing currents. This objection and disadvantage is obviated in a construction embodying my invention, where the flux variations produced by coil C or C′ take place only in the associated pole pieces and core outside the steel mass of the magnet. In other words, variations in magnetic flux are confined to a path of high permeability, so that variable impulses in the telephone coil produce flux changes with minimum loss and maximum efficiency.

Although I have herein shown and described certain specific constructions, I would have it understood that I have done so for the sake of explaining my invention to those skilled in the art, and not by way of restriction or limitation. It will be apparent that the various features of my invention may be mechanically embodied in other forms than herein set forth. As far as I know, I am the first to provide a telephone instrument in which the magnetic effect of the telephone coil is controlled without changing the normal airgap between the magnet and the armature, and without diverting or shunting any portion of the normal magnetic field from the armature. Hence, I claim this idea in a fundamental way. I may add that in the drawings I have not attempted to show the operative parts in mathematically calculated proportions, since the relative sizes and dimensions of those parts will vary in different embodiments of the invention, and also since the correct design of the instrument in each case is readily determined by the man skilled in this art.

It will be understood that, although the illustrative embodiment shown in the drawings has been described as a telephone receiver, the various features of my invention are equally applicable in various other electrical instruments of that type.

I claim as my invention:

1. In a telephone receiver, a magnet, a vibratory armature operatively associated with the poles of said magnet, a coil for causing vibration of said armature, and manually controlled means for regulating the magnetic effect of said coil on the normal field of said magnet independently of the airgap between the armature and the magnet poles, said regulating means being arranged to operate without diverting any portion of the normal magnetic field from the armature.

2. In a telephone receiver, a magnet, a vibratory armature operatively associated with the poles of said magnet, a coil for causing vibration of said armature, and manually controlled means for varying the reluctance of the magnetic circuit produced by said coil without varying the airgap between the armature and the magnet poles, said regulating means being arranged to operate without diverting any portion of the normal magnetic field from the armature.

3. In a telephone receiver, a magnet, a vibratory armature operatively associated with the poles of said magnet, a coil for causing vibration of said armature, a magnetic core for said coil, said core being arranged outside the normal flux path of said magnet so as not to divert any portion of the normal magnetic field from the armature, and means for varying the magnetic permeability of said core, whereby the magnetic effect of said coil on the field of said magnet and therefore on the armature is varied accordingly.

4. In a telephone receiver, a magnet, a vibratory armature operatively associated with the poles of said magnet, a coil for causing vibration of said armature, a magnetic core for said coil, said core consisting of separable sections arranged outside the normal flux path of said magnet so as not to divert any portion of the normal magnetic field from the armature and means for adjusting one section relatively to the other for varying the magnetic effect of said coil on said armature.

5. In a telephone receiver, a magnet having oppositely arranged pole pieces, one of said pole pieces consisting of a pair of spaced limbs or bifurcations, a magnetic core connecting the limbs of said bifurcated pole piece, a vibratory armature operatively associated with said pole pieces, a coil on said core to cause vibration of said armature, means for regulating the magnetic effect of said coil on the normal field of said magnet, independently of the airgap between the magnet poles and the armature and without diverting any portion of the normal magnetic field from the armature, and an acoustic member controlled by said armature.

6. In a telephone receiver, a magnet having oppositely arranged pole pieces, one of said pole pieces consisting of a pair of spaced limbs or bifurcations, a magnetic core arranged between the limbs of said bifurcated pole piece, a vibratory armature operatively associated with said pole pieces, a coil on said core to cause vibration of said armature, means for varying the magnetic permeability of said core without diverting any portion of the normal magnetic field from the armature and thereby controlling the magnetic effect of said coil on the normal field of said magnet, and an acoustic member controlled by said armature.

7. In a telephone receiver, a magnet having oppositely arranged pole pieces, one of said pole pieces consisting of a pair of spaced limbs or bifurcations, a magnetic core connecting the limbs of said bifurcated pole piece, said core consisting of separable sections arranged outside the normal flux path of said magnet so as not to divert any portion of the normal magnetic field from the armature, a vibratory armature operatively associated with said pole pieces, a coil on said core to cause vibration of said armature, means for adjusting one core section relatively to the other for varying the magnetic effect of said coil on said armature, and an acoustic member controlled by said armature.

8. In a telephone receiver, a magnet having pole pieces, a vibratory armature mounted in operative relation to said pole pieces, the ends of said armature being separated from the respective pole pieces by a practically minimum airgap and arranged to move past the polar faces of the pole pieces without striking said pole pieces during the maximum vibrations of the armature, a coil for causing vibration of said armature, means for varying the magnetic effect of said coil on the normal field of said magnet without varying said minimum airgap and without diverting any portion of the normal magnetic field from the armature, and an acoustic member controlled by said armature.

9. In a telephone receiver, a magnet having pole pieces, a vibratory armature mounted in operative relation to said pole pieces, the ends of said armature being separated from the respective pole pieces by a practically minimum airgap and arranged to move past the polar faces of the pole pieces without striking said pole pieces during the maximum vibrations of the armature, a coil for causing vibration of said armature, manually controlled means for varying the reluctance of the magnetic circuit produced by said coil without varying said minimum airgap and without diverting any portion of the normal magnetic field from the armature, and an acoustic member controlled by said armature.

10. In a telephone receiver, a magnet having pole pieces, a vibratory armature mounted in operative relation to said pole pieces, the ends of said armature being separated from the respective pole pieces by a practically minimum airgap and arranged to move past the polar faces of the pole pieces without striking said pole pieces during the maximum vibrations of the armature, a coil for causing vibration of said armature, a magnetic core for said coil, said core being arranged outside the normal flux path of said magnet so as not to divert any portion of the normal magnetic field from the armature, means for varying the magnetic permeability of said core to regulate the magnetic effect of said coil on the armature independently of said airgap, and an acoustic member controlled by said armature.

11. In a telephone receiver, a magnet, a vibratory armature extending between the poles of said magnet, a coil for causing vibration of said armature, and means for regulating the magnetic effect of said coil on said armature without varying the normal path of the flux of said magnet across the airgap between the magnet poles and the armature.

12. In a telephone receiver, a vibratory armature operatively supported in a magnetic field, an acoustic member, means for so connecting said acoustic member with said armature that the vibrations of the armature are transmitted in increased ratio to said acoustic member, said connections including a device supported on a fixed pivot, and manually operable means for adjusting said connecting device to vary the transmission ratio between said armature and said member.

13. In a telephone receiver, a vibratory armature operatively supported in a magnetic field, an acoustic member, connections between said armature and said member for transmitting the vibrations of the armature in increased ratio to said member, said connections including an arm supported on a fixed pivot and means for varying the effective leverage of said arm to vary the transmission ratio between said armature and said member.

14. In a telephone receiver, an acoustic diaphragm, a pivoted bell-crank lever having a long arm and a short arm, means for connecting the free end of said long arm with the center of said diaphragm, a vibrating armature operatively mounted in a magnetic field, means for pivotally supporting said armature independently of said lever, and means for connecting the free end of said short arm to said armature, whereby the vibrations of said armature are transmitted to said diaphragm in increased ratio.

15. In a telephone receiver, an acoustic diaphragm, a vibrating armature operatively mounted in a magnetic field, a pivoted bell-crank lever having a long arm and a short arm, means for supporting said armature independently of said lever, means for connecting the free end of said long arm with the center of said diaphragm, means for connecting the free end of said short arm to said armature, whereby the vibrations of said armature are transmitted to said diaphragm in increased ratio, and means for adjusting the effective length of said short arm.

16. In a loud-speaking telephone receiver, an outer casing having a cylindrical section provided with a screw-threaded portion, a support removably fitting into said cylindrical section and held in place by said screw-threaded portion, said support comprising a base and a ring, an acoustic diaphragm mounted on said ring, electro-magnetic mechanism including a vibratory armature mounted on said base, and an operative connection between said diaphragm and said armature, said support and all parts carried thereby constituting a unit insertable into and removable from said outer casing.

17. In a telephone receiver, a pair of magnets having their like poles arranged oppositely and spaced from each other, a polar projection extending from each pole, the polar projections of each pair of like poles constituting a bifurcated pole piece having an airgap between the free ends of the projections, a vibratory armature normally held substantially in alignment with the airgaps of said polar projections, a magnetic core arranged between each pair of polar projections, a coil on each core for causing vibration of said armature, and a diaphragm operatively connected to said armature.

18. In a telephone receiver, a pair of magnets having their like poles arranged oppositely and spaced from each other, a polar projection extending from each pole, the polar projections of each pair of like poles constituting a bifurcated pole piece having an airgap between the free ends of the projections, a vibratory armature normally held substantially in alignment with the airgaps of said polar projections, a magnetic core arranged between each pair of polar projections, a coil on each core for causing vibration of said armature, manually adjustable means for controlling the magnetic effect of one or both coils on said armature, and a diaphragm operatively connected to said armature.

19. In a telephone receiver, a pair of magnets having their like poles arranged oppositely and spaced from each other, a polar projection extending from each pole, the polar projections of each pair of like poles constituting a bifurcated pole piece having an airgap between the free ends of the projections, a vibratory armature normally held substantially in alignment with the airgaps of said polar projections, a magnetic core arranged between each pair of polar projections, a coil on each core for causing vibration of said armature, manually operable means for varying the reluctance of the magnetic circuits produced by said coils without adjusting the airgaps of said polar projections, and a diaphragm operatively connected to said armature.

20. In a telephone receiver, a pair of magnets having their like poles arranged oppositely and spaced from each other, a polar projection extending from each pole, the polar projections of each pair of like poles constituting a bifurcated pole piece having an airgap between the free ends of the projections, a vibratory armature extending lengthwise between the airgaps of said polar projections, an adjustable magnetic core arranged between each pair of polar projections, a coil on each core for causing vibration of said armature, means for adjusting said cores to vary the magnetic effect of said coils on the armature, and a diaphragm operatively connected to said armature.

21. In a telephone receiver, a magnet having fixed pole pieces, a vibratory armature operatively associated with said magnet, a coil for causing vibration of said armature, and an adjustable core extending through said coil for regulating the magnetic effect of said coil on said armature independently of said pole pieces.

22. In an electric instrument, a magnet having pole pieces, a vibratory armature operatively associated with said pole pieces, there being an operative airgap between the armature and the magnet, a coil operatively associated with said armature, a magnetic core for said coil, and means for varying the magnetic permeability of said core independently of said airgap, whereby the movements of said armature do not affect the adjusted permeability of the core.

23. In an electric instrument, a magnet having pole pieces, a vibratory armature operatively associated with said pole pieces, there being an operative airgap between the armature and the magnet, a coil operatively associated with said armature, a magnetic core for said coil, and means for producing an adjustable airgap in the core independently of said operative airgap, whereby the movements of said armature do not disturb the adjusted airgap in the core.

24. In an electric instrument, a magnet having pole pieces, an armature operatively associated with said pole pieces and separated therefrom by an airgap, and a coil provided with a magnetic core consisting of sections which are relatively adjustable independently of said pole pieces and said airgap, whereby the movements of said armature have no effect on the adjusted position of said sections.

25. In an electric instrument having a magnet and a movable armature, a coil having a magnetic core, and controllable means for producing an adjustable airgap in said core and maintaining said airgap as adjusted independently of the movements of said armature.

26. In an electric instrument having a movable magnetic armature, a coil provided with a magnetic core consisting of relatively adjustable sections for producing a variable airgap therebetween, and means for mounting said sections independently of said armature.

27. In a telephone receiver, a magnet having a bifurcated pole piece, an armature operatively associated with said magnet, a magnetic core between the bifurcations of said pole piece, a coil on said core, and means for varying the magnetic permeability of said core to control the magnetic effect of said coil on the flux passing through said bifurcations and the armature.

28. In a telephone receiver, a magnet, a movable armature operatively associated with said magnet, a coil for controlling said armature, and adjustable magnetic means arranged outside the normal flux path of said magnet for controlling the magnetic effect of said coil on said armature independently of the normal airgap between the magnet and the armature.

29. In a telephone receiver, a magnet for maintaining a normal magnetic field, said magnet having pole pieces, a movable magnetic member operatively associated with said pole pieces, a coil for controlling the operation of said member, and adjustable magnetic means independent of said pole pieces and said member for controlling the reluctance of the magnetic circuit of said coil.

30. In a loudspeaker, a magnet structure having four pole pieces, like poles being arranged in spaced relation, a magnetic bar connecting each pair of spaced like poles, said bars being separate from the main magnet structure, a coil mounted on each bar between like poles, whereby the normal field flux does not pass through said coils, and acoustic means operated by the combined action of said magnet and coils.

31. In a telephone instrument, a magnet having pole pieces, one of said pole pieces being bifurcated, an armature operatively associated with said pole pieces, a magnetic core connecting the limbs of said bifurcated pole piece and arranged outside the normal flux path of said magnet, and a coil surrounding said core.

32. A telephone instrument comprising a pair of magnets having their poles arranged oppositely and spaced from each other, a polar projection extending from each pole, the polar projections of each pair of like poles constituting a bifurcated pole piece having an airgap between the free ends of the projections, a vibratory armature operatively associated with said polar projections, a magnetic core arranged between each pair of polar projections, a coil on each core, and a diaphragm operatively connected with said armature.

33. In a telephone instrument, a base, a magnet mounted on said base, an armature operatively associated with said magnet, an acoustic diaphragm mounted substantially parallel with said base, a bell-crank lever consisting of a long arm and a short arm, both of said arms being separate from said armature, means for freely pivoting said lever at the junction of said arms, means for securing the free end of said long arm to said diaphragm, and means for connecting said armature to said short arm, whereby the movements of said armature are transmitted to said diaphragm in increased ratio.

34. In a telephone instrument, a pivoted bell-crank lever consisting of means for connecting the free end of said long arm with said diaphragm, a vibratory armature mounted in a magnetic field and arranged to vibrate in a plane substantially perpendicular to the plane or axis of vibration of said diaphragm, and an operative connection between said armature and the short arm of said lever.

35. In an electric instrument, a magnetic system including an adjustable bar to regulate certain flux values of said system, means for supporting said bar for combined rotary and axial movement to adjust its position relatively to a fixed part of said system, a gear mounted on said bar to rotate the same and thereby cause axial adjustment of said bar, the connection between said gear and said bar permitting axial movement of the latter, a worm for operating said gear, and a manually operable member for actuating said worm.

36. In an electric instrument, a magnetic system including an adjustable bar to regulate certain flux values of said system, means for supporting said bar for combined rotary and axial movement to adjust its position relatively to a fixed part of said system, a member for rotating said bar and thereby adjusting the same axially, a second member engaging said first member for operating the latter, the engagement between said members automatically locking said bar in adjusted position and positively preventing movement of said bar except through said second member, and means for controlling said second member.

37. In an electric instrument, a base, a magnet mounted on said base, an adjustable magnetic bar associated with said magnet, means for mounting said bar for combined rotary and axial movement relatively to said magnet, a hand-operable rotary member extending through said base and accessible from outside the instrument, and a micrometer driving connection between said bar and said member for imparting simultaneous rotary and axial movement to said bar in either direction.

38. In an electric instrument, a magnet, an armature operatively associated with said magnet, a coil for causing vibration of said armature, a magnetic core for said coil, said core consisting of a fixed section and an axially adjustable section, the adjacent ends of said sections being respectively in the shape of a conical recess and a conical extension to provide a cone-shaped airgap between said sections, and means for adjusting the second section relatively to the fixed section for varying the width of said airgap.

39. In an electric instrument having a movable magnetic armature, a coil provided with a magnetic core consisting of relatively adjustable sections for producing a variable airgap therebetween, the adjacent ends of said sections being respectively in the shape of a conical recess and a conical extension to provide a cone-shaped airgap between said sections, and means whereby said airgap is maintained as adjusted independently of the movements of said armature.

40. In a telephone receiver, a magnet structure comprising a pair of bifurcated pole pieces oppositely arranged, a vibratory armature mounted in operative relation to said pole pieces, a magnetic core arranged between each pair of bifurcations so as to be outside the normal flux path of said magnet, a coil on each core for controlling the vibration of said armature, and a diaphragm operated by said armature.

41. In a telephone receiver, a magnet structure comprising a pair of bifurcated pole pieces oppositely arranged, a vibratory armature mounted in operative relation to said pole pieces, a magnetic core arranged between each pair of bifurcations, a coil on each core for controlling the vibrations of said armature, manually adjustable means for controlling the magnetic effect of one or both coils on said armature, and a diaphragm operated by said armature.

42. In a telephone receiver, a magnet structure comprising a pair of bifurcated pole pieces oppositely arranged, a vibratory armature mounted in operative relation to said pole pieces, a magnetic core arranged between each pair of bifurcations, a coil on each core for controlling the vibration of said armature, manually operable means for varying the reluctance of the magnetic circuits produced by said coils without adjusting the normal airgap between said pole pieces and said armature, and a diaphragm operated by said armature.

43. In a telephone receiver, a magnet structure comprising a pair of bifurcated pole pieces oppositely arranged, a vibratory armature mounted in operative relation to said pole pieces, a magnetic core arranged between each pair of bifurcations, a coil on each core for controlling the vibration of said armature, means for adjusting said cores to vary the magnetic effect of said coils on the armature, and a diaphragm operated by said armature.

44. In a telephone instrument, a magnet having a vibratory armature, a diaphragm, a lever mounted between its ends on a fixed pivot, one end of said lever being connected to said diaphragm and the other end to said armature, and means for adjusting the effective length of said lever between its pivot and one end thereof to vary the transmission ratio between said armature and said diaphragm.

45. In a telephone instrument, a magnet, a vibratory magnetic member operatively associated with said magnet, there being an operative airgap between said magnet and said member, a pair of coils operatively associated with said vibratory member, and a magnetic core for each coil, the magnetic circuit of each coil having a predetermined fixed airgap separate from said operative airgap.

46. In a loudspeaker, a pair of permanent magnets arranged with their like poles in spaced relation, an iron bar connecting each pair of like poles, a coil mounted on each bar between like poles, so that the normal field flux does not pass through said coils, and acoustic means operated by the combined action of said magnets and coils.

47. In an electric instrument of the telephone type, a magnet structure having rigid pole pieces connected by a pair of magnetic cores, there being a predetermined fixed airgap for each core to provide a magnetic path of predetermined reluctance through each core, a coil on each core, and a vibratory magnetic member in operative relation to said pole pieces, the airgaps in said magnetic paths through the cores being independent of the variable airgap between said pole pieces and said vibratory member.

48. In a telephone receiver, a permanent magnet, pole pieces attached to said magnet in magnetic contact therewith and having means to provide a magnetic path with a predetermined airgap, said magnetic path being of greater permeability than said permanent magnet and including said pole pieces in series, a coil in said magnetic path between the pole pieces, and a vibratory member in operative relation to said magnet and coil.

49. In a telephone receiver, a permanent magnet having pole pieces of greater permeability than the magnet itself, said pole pieces being in magnetic contact with said magnet, a coil associated with said pole pieces for producing a varying flux, means whereby the flux variations occur in a path including said pole pieces and a predetermined airgap in series, said path being outside the mass of said permanent magnet, and a vibratory member controlled by said flux variations, said predetermined airgap being independent of the vibratory movements of said member.

50. In a telephone receiver having a permanent magnet, a polar attachment for said magnet comprising a pair of pole pieces connected by a transverse magnetic core carrying a coil, said core providing an airgap within said coil, and a vibratory magnetic member in operative relation to said magnet and coil, said pole pieces and core forming a variable magnetic circuit of greater permeability than said permanent magnet.

51. In an apparatus used to convert audio electrical variations into sound vibrations, or sound vibrations into electric excitations, the combination of a magnet element, opposite poles thereof forming an airgap between them, an armature in the airgap, a diaphragm and a right angled link member connecting the armature to the diaphragm and fulcrumed substantially at the apex of said right angle.

52. A loudspeaker comprising an acoustic diaphragm, a right-angled lever fulcrumed substantially at the apex of the angle, means for connecting one end of said lever to the center of said diaphragm, a vibratory armature operatively mounted in a magnetic field and supported independently of said lever, and means for connecting the other end of said lever to said armature.

53. A loudspeaker comprising an acoustic diaphragm, a right-angled lever fulcrumed substantially at the apex of the angle, said lever consisting of a long arm and a short arm, means for connecting one of said arms to the center of said diaphragm, a vibratory armature operatively mounted in a magnetic field and supported independently of said lever, and means for connecting the other arm of said lever to said armature, the relative lengths of said arms determining the transmission ratio between the armature and the diaphragm.

54. In a loudspeaker, a permanent magnet structure comprising oppositely arranged magnets, pole pieces extending toward each other centrally of said magnet structure, a vibratory armature operatively mounted in the airgap between said pole pieces, a pair of armature coils mounted on said magnet structure in operative relation to said armature, a diaphragm, and a right-angled lever system to transmit the vibrations of the armature to the diaphragm at desired amplitude.

ADOLPH A. THOMAS.